United States Patent [19]

Sako et al.

[11] 4,145,385
[45] Mar. 20, 1979

[54] PASTE EXTRUSION OF PTFE

[75] Inventors: Junichi Sako, Suita; Norimasa Honda, Settsu; Hideo Tokunaga, Osaka; Toshiro Hoshino, Seettsu; Shin-ichiro Kai, Ibaraki, all of Japan

[73] Assignee: Daikin Kogyo Co., Ltd., Osaka, Japan

[21] Appl. No.: 860,889

[22] Filed: Dec. 15, 1977

[30] Foreign Application Priority Data

Dec. 25, 1976 [JP] Japan .................................. 51-157260

[51] Int. Cl.² ............................................. B29F 3/03
[52] U.S. Cl. ..................................... 264/22; 264/118; 264/127; 264/119; 51/293
[58] Field of Search ................. 264/127, 118, 22, 119; 51/296, 293

[56] References Cited

U.S. PATENT DOCUMENTS

| 2,752,637 | 7/1956 | Walker | 264/127 |
| 3,196,194 | 7/1965 | Ely, Jr. et al. | 264/127 |
| 3,295,166 | 1/1967 | Owings | 264/127 |
| 3,313,642 | 4/1967 | Waugh | 264/22 |
| 3,333,032 | 7/1967 | Dickinson | 264/22 |

Primary Examiner—Robert F. White
Assistant Examiner—James R. Hall
Attorney, Agent, or Firm—Lane, Aitken & Ziems

[57] ABSTRACT

The fibrillated surface layer of an unsintered extruded mass of a polytetrafluoroethylene is broken by mechanical or electrical force to facilitate evaporation of the lubricant whereby a molded article which is free from defects such as cracks and blisters is obtained upon sintering.

5 Claims, 11 Drawing Figures

PASTE EXTRUSION OF PTFE

BACKGROUND OF THE INVENTION

This invention relates to the production of molded articles of polytetrafluoroethylene (hereinafter referred to simply as PTFE) and more particularly, to a method for the production of extruded articles of PTFE by paste extrusion in which the extruded green body is mechanically or electrically treated, before sintering, to render its surface rough or porous so as to facilitate vaporization and removal of an extrusion lubricant.

In the prior art paste extrusion of PTFE it is common practice that PTFE powder, generally called "fine powder", obtained by emulsion polymerization, with or without addition of fillers such as carbon, glass, molybdenum disulfide, etc., is uniformly admixed with a liquid lubricant which serves as an extrusion aid such as solvent naphtha or other petroleum base, low boiling point substance, and the moistened powder is extruded. Such prior art processes are disclosed, for example, in U.S. Pat. No. 2,752,637 and British Pat. No. 1,030,035. The amount of the lubricant used is generally in the range of 15-23% by weight of the mixture when no filler is contained, though varying depending on the type of the starting powder and extruding conditions. However, where the starting powder contains a filler, it is necessary to increase the amount of the lubricant. For example, with PTFE powder containing 20% by weight of carbon powder, the amount of lubricant is required to be in the range of 25-35% by weight.

The paste-extruding procedure for PTFE will be described with reference to the accompanying drawings, particularly FIGS. 1 and 2. Firstly, the PTFE powder in uniform admixture with a lubricant is preformed under a relatively low pressure of about 3-50 kg/cm$^2$ in the manner shown in FIG. 1. In FIG. 1, 1 designates a preform made from the starting powder, at 2 is a mold for the preform, at 2' and 2" are inner molds, respectively, and at 3 is a piston of a compressor. As shown in FIG. 2, the preform fabricated as in FIG. 1 is then inserted in a cylinder 4 and extruded under pressure exerted by a piston 5 through a die 7 heated at 30°-80° C. by a heater 6 to produce an unsintered extruded mass 8. The mass moves downward, as viewed in FIG. 2, and enters a furnace 9. The furnace 9 includes a drying zone 10 at 100 to 300° C. in its upper section and a sintering zone 11 in its lower section wherein the mass is sintered under a controlled temperature generally ranging from 360°-450° C. Though it is usually preferred that the extruded unsintered mass be continuously introduced into the furance as schematically shown in FIG. 2, the extrusion and sintering steps need not be performed continuously.

In the technique illustrated in FIG. 2, the mass 8 is passed through a normal temperature zone 12 into the drying zone 10 of the furnace 9. Upon the passage of the mass 8 through the zone 12, a fair portion of the low boiling point lubricant contained in the mass 8 is removed by evaporation from its surface and the remaining portion is evaporated off in the drying zone 10. Upon entering the sintering zone 11, the mass is substantially composed of PTFE alone. In zone 11 it is sintered to form the finished product 13.

The prior techniques described above often encounter problems in that the molded articles obtained after the sintering often have cracks or blisters at their surfaces. Such problems are encountered with certain starting powders, moldings of certain shapes and sizes and certain extruding conditions. Needless to say, molded articles having such defects lose their commercial value and it is thus very important to prevent such occurrences. Nevertheless, no detailed study as to how and why the cracks and blisters are produced has previously been conducted and conventional molding operations have been conducted mainly on the basis of many years' operational experience.

SUMMARY OF THE INVENTION

We have made an intensive study on the prevention of the formation of cracks and blisters on articles of PTFE molded by paste extrusion. As a result, we have developed a technique for preventing occurrence of cracks, our invention being based on new knowledge of the structure of articles molded by paste extrusion. Such extruded masses of PTFE have been found to have fibrillated surface layers of a specific structure which impede evaporation of the liquid lubricant. It has been confirmed that if this layer is destroyed or broken by mechanical or electrical force, the evaporation of the lubricant is expedited so that the occurrence of cracks or blisters of the molding can substantially be prevented. We have found that the paste-extruded mass includes a core which is composed of a fine powder of PTFE, i.e., the starting material having a size of about 0.05-0.5 $\mu$ in a packed state and which does not show any appreciable change in appearance from the starting material, and a very thin fibrillated surface layer densely covering the core. The structure of the extruded mass is clearly seen in FIGS. 3-6, which illustrate photographs, taken by a scanning type electron microscope, of sectional fractions of the mass in the neighborhood of its surface which have been obtained by breaking the mass after cooling with liquid nitrogen. FIG. 3 is a microphotographic representation of a fraction at a magnification of 1000× from which it will be seen that the mass is covered with a dense fibrillated surface layer of a constant thickness, the layer being distinctly distinguishable from the inner non-fibrillated powder core. FIGS. 4-6 illustrate microphotographs each at a magnification of 10,000× of portions of the section shown in FIG. 3, i.e., a portion of the fibrillated surface layer (FIG. 4), a boundary between the fibrillated layer and the powder layer (FIG. 5), and the inner powder core (FIG. 6). It is known that the fine powder PTFE tends to be fibrillated when it is subjected to a shearing form. Accordingly, it is believed that the fibrillated surface layer results from the shearing force exerted on the particles at the mass surface by its sliding contact with the inner surface of the die upon extrusion. Nevertheless, the discovery that such a fibrillated layer is so densely formed only on the surface of the mass as to be distinctly distinguished from the apparently unchanged powder core is considered surprising.

The thickness of the fibrillated layer varies depending upon the extrusion conditions but is generally in a range as small as about 0.5-20 $\mu$. Where a higher mixing ratio of liquid lubricant to PTFE powder is used, the resulting fibrillated layer becomes thinner. The thickness increases with an increase of the extrusion pressure. The thickness will also increase with an increase of the so-called "reduction ratio" expressed in terms of the ratio of the internal sectional area of the cylinder 4 of the extruder to the internal sectional area of the die 7 (FIG. 2). These conditions interdependently influence the thickness of the fibrillated surface layer on the mass.

As previously mentioned, the lubricant admixed with the starting PTFE powder is a volatile liquid and starts to evaporate immediately after the mass leaves the die 7 of the extruder. Considerable portion of the lubricant contained in the mass is removed by evporation from the surface of the mass before the mass reaches the sintering zone 11 via the drying zone 10. The evaporation takes place from the inside of the mass towards the outside through the fibrillated layer. If the fibrillated layer is too thick, the lubricant can not satisfactorily evaporate due to the decreased permeability of the surface layer, i.e., the surface layer becomes a gas barrier. An extruded mass which contains a large portion of the lubricant upon entry into the sintering zone will show cracks or local blisters at its surface formed during sintering. Though the cracks or blisters tend to occur when the surface fibrillated layer of the mass is relatively thick, a similar tendency may occur in many other cases, e.g., in cases where the extruded mass has a large diameter and its surface area is small relative to its volume, in cases where large amounts of lubricant are used such as in the case of extrusion of filler-containing PTFE powder or where a filler such as carbon powder having a high affinity for lubricant is used, and in cases where a multilayer extruded mass is produced by a simultaneous extrusion process using at least two kinds of starting powders, for example, where the core is a filler-containing powder and the outer layer being a filler-free PTFE powder. Further, where the paste extrusion is conducted at high speed, the extruded mass tends to crack because of an abrupt increase in temperature upon entering the drying zone. To avoid this, the extrusion speed has been empirically determined and controlled below a predetermined suitable value, in the prior art process.

The above-mentioned problems concerning cracks or blisters are completely and simply solved by the present invention, using an improved extrusion process which is based on the finding that cracks or blisters in the molded article are caused by the existence of the gas barrier or fibrillated layer formed on the surface of the extruded mass.

By destroying or breaking the fibrillated layer on the green PTFE mass surface, not only is formation of cracks or blisters of the moldings completely prevented, but also many difficulties and problems involved in the paste extrusion of PTFE are overcome or solved. The method of the invention has a number of advantages including the ability to make PTFE articles by paste extrusion which have larger diameters than heretofore considered possible and the ability to operate with an extrusion speed higher than that possible with prior art methods. Moreover, the present invention solves the previously mentioned problems associated with the extrusion of a filler-containing PTFE core which must be admixed with a relatively large amount of a lubricant prior to extrusion, preventing the cracks or blisters which would otherwise tend to occur due to the existence of a relatively dense unfilled outer layer of PTFE.

DETAILED DESCRIPTION OF THE PREFERRED EMBODIMENTS

Figure 2:
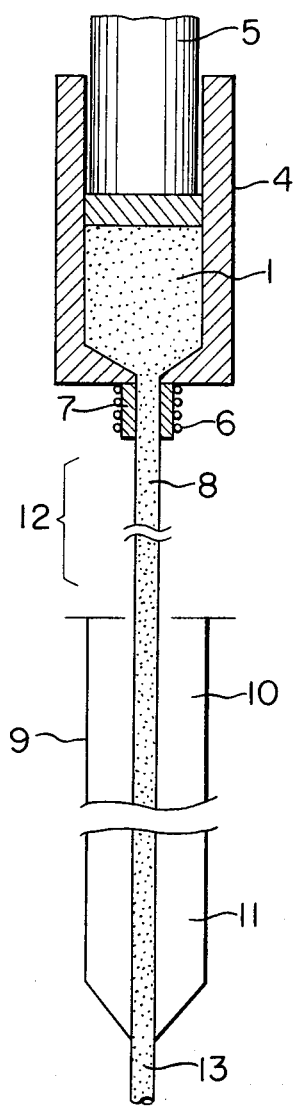
FIG. 2 is a schematic illustration of a prior art process for extrusion of a "green" preform.
Figure 7:
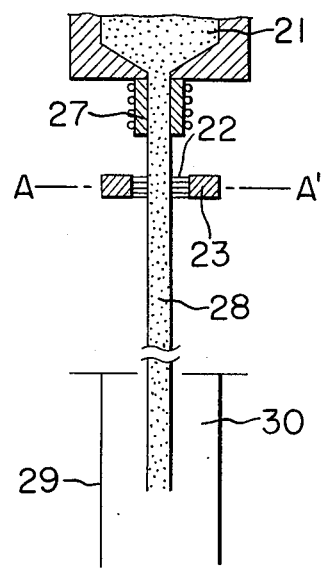
FIG. 7 is a schematic illustration of one embodiment of the present invention wherein a brush is used to break the fibrillated surface layer of the extrudate.

Since the fibrillated layer on the surface of the extruded green mass is very thin and is soft due to the inclusion of the liquid lubricant, the layer is easily broken. For example, weak mechanical contact such as with a brush, before the mass discharged from the die enters the drying zone of the heating surface, is sufficient to break the surface layer. This is particularly illustrated in FIGS. 7 and 8. FIG. 7 is a schematic view showing surface abrasion and breakage with a brush. In FIG. 7, lubricant-containing starting powder 21 is extruded from the die 27 in a manner similar to that illustrated in FIG. 2 and the resulting unsintered mass 28 is then abraded with a brush 22, for example, of animal hair or synthetic fibers. The material and shape of the brush are not considered critical but it is important that the mass be contacted substantially completely around its periphery 28 with a bristle which is somewhat harder than the extruded mass. In FIG. 7 indicated at 23 is a brush holder. The brush 22 is preferably located between the die 27 and the drying zone 30 of the furnace 29, and most preferably in an area just below (below and adjacent to) the die 27.

Figure 3:
FIG. 3 is a microphotograph (by electron scanning microscope — 1000×) of a cross-section of a PTFE powder/lubricant extrudate.
Figure 5:
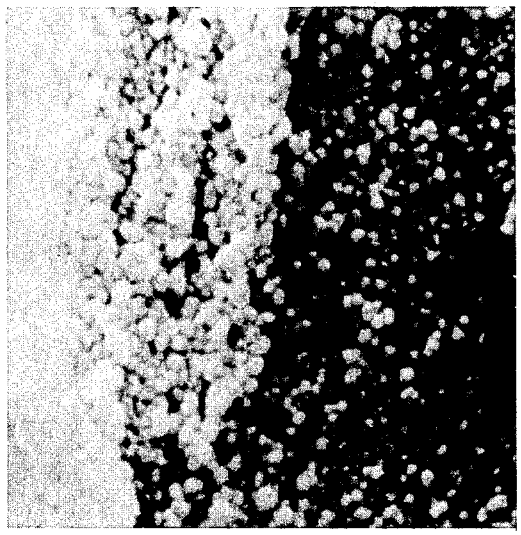
FIG. 5 is a microphotograph of the section of FIG. 3 (10,000×) showing the boundary between the fibrillated layer and the powder core.
Figure 4:
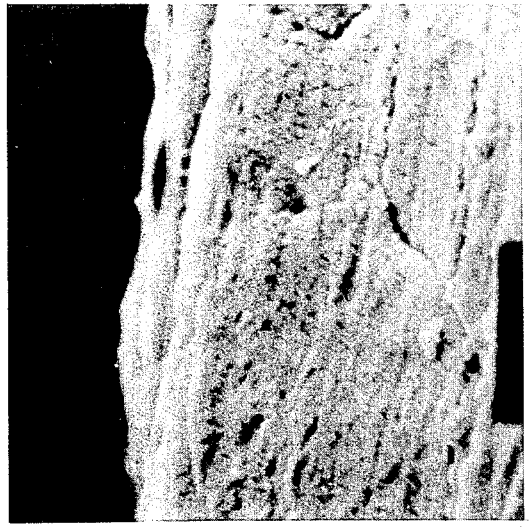
FIG. 4 is a microphotograph (by electron scanning microscope — 10,000×) of the section of FIG. 3 showing the fibrillated surface layer.
Figure 6:
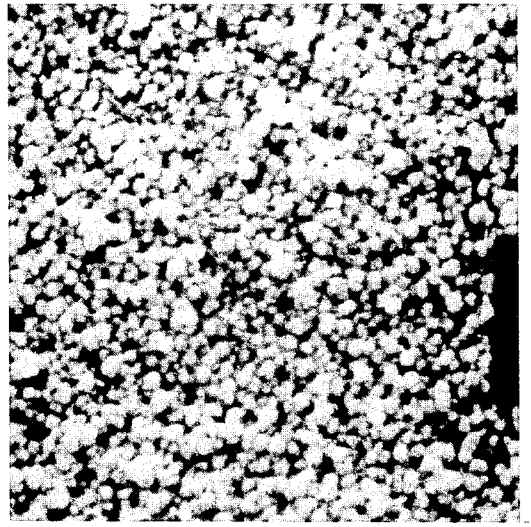
FIG. 6 is a microphotograph of the section of FIG. 3 (10,000×) showing a blow-up view of the powder core.
Figure 8:
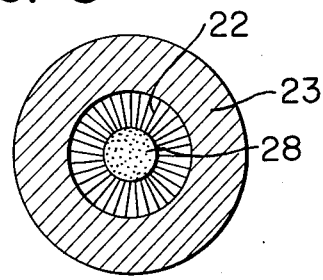
FIG. 8 is an enlarged view, in cross-section, of the brush of the embodiment of FIG. 7 taken along line A—A'.

By contacting the outer surface of the extruded mass with the brush 22 as illustrated in FIGS. 7 and 8, the fibrillated layer as shown in FIG. 3 is sufficiently broken so that the lubricant contained in the mass can rapidly evaporate through the surface layer. This can be readily recognized by the fact that when the surface layer of an extruded mass or extrudate is composed of PTFE alone (not containing any fillers), the surface of the mass produced immediately after the extrusion appears to be transparent due to the existence of the liquid lubricant but turns milk-white in color, which is inherent to PTFE, within an extremely short period of time, before the mass reaches the furnace 29.

The unsintered mass 28 is subsequently heated in the drying zone 30 of the furnace 29, whereupon the remaining lubricant is rapidly evaporated from the mass surface. Since a multiplicity of abrasions by the brush are formed in the fibrillated layer of the mass surface, the vapor of the lubricant can readily escape through the abrasions. The rapid evaporation prevents build-up of internal pressure within the extruded mass 28, thus preventing occurrence of cracks or blisters on the mass surface upon sintering.

When the extruded mass is contacted with the brush the result is abrasion and, consequently, the surface will have less luster as compared to conventional extrusion moldings and tends to be frosted in appearance. If importance is attached to the gloss of the molding surface, it is desirable to control the abrasion of the fibrillated surface layer by the brush or other means to an irreducible minimum. In general, it is sufficient to control the contacting force of the brush so that the abrasions or flaws formed on the surface by the brush are hardly visible. If the contact pressure of the brush is too great, fibrils or fine fibers are drawn out from the fibrillated surface layer of the mass to make the surface nappy. This may reduce the commercial value of the final product to an extent. Brushes suitable for the purpose of mechanical contact include ordinary paint brushes, hair brushes for painting or writing, gauze, broken pieces of paper, etc. In addition to animal hair, other bristle materials suitable for the mechanical brush include chemical fibers, metal fibers, plant fibers, etc.

Figure 9:
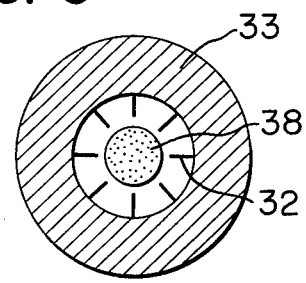
FIG. 9 is a cross-sectional view of an electrode used in another embodiment of the present invention.

The breakage of the fibrillated surface layer may be achieved by electrical means as an alternative or addition to mechanical means. FIG. 9 shows an embodiment for breaking the surface layer by electrical means. In FIG. 9, instead of the brush 22 of FIG. 7, there is used a metal electrode 33 which is disposed around the extruded mass 38 and provided with a plurality of inner needle-like discharge electrodes 32 surrounding the mass 38. When a high voltage is applied to the discharge electrodes 32 causing electrical discharges against the mass surface, very fine pinholes are formed on the surface of the mass 38, resulting in breakage of the fibrilated surface. In this case, the appearance of the surface is less frosted than by use of brush 22 but the electrical treatment has the same effect of preventing the cracks or blisters as the mechanical treatment.

The present invention will be further illustrated by the following examples.

EXAMPLE 1

Figure 1:
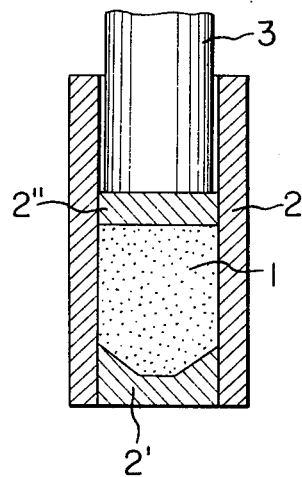
FIG. 1 is a schematic illustration of a prior art technique for producing a "green" preform.
Figure 10:
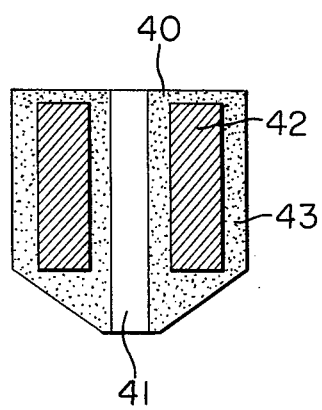
FIG. 10 is a cross-sectional view of a green preform as used in the working examples herein.

A mold for preforms as illustrated in FIG. 1 (but additionally using a cylindrical mold inserted through the center of the preform mold) was used to make a preform 40 having a longitudinal, central through-hole 41 as seen in FIG. 10. The preform 40 included an inner material 42 which was wholly covered with an outer material 43. That is, the inner material or shape had been formed in a separate mold to make a preform. This preform was then placed in the above-mentioned mold in a manner as to be covered with the material 43 and subjected to compression preforming to make the preform 40.

The inner and outer materials had the following formulations.

| Inner Material: | | |
|---|---|---|
| PTFE Fine Powder | 80 wt % | } 1.26 kg |
| Carbon powder | 20 wt % | |
| Solvent Naphtha | | 0.44 kg |
| Outer Material: | | |
| PTFE Fine Powder | | 2.5 kg |
| Solvent Naphtha | | 0.5 kg |

The inner preform 42 and the preform 40 had the following sizes and were made under preforming pressures indicated below, respectively.

| | Size (mm) | | Preforming pressure kg/cm² |
|---|---|---|---|
| | inner diameter | outer diameter | |
| Inner preform | 75 | 112 | 30 |
| Preform | 35 | 129 | 10 |

Figure 11:
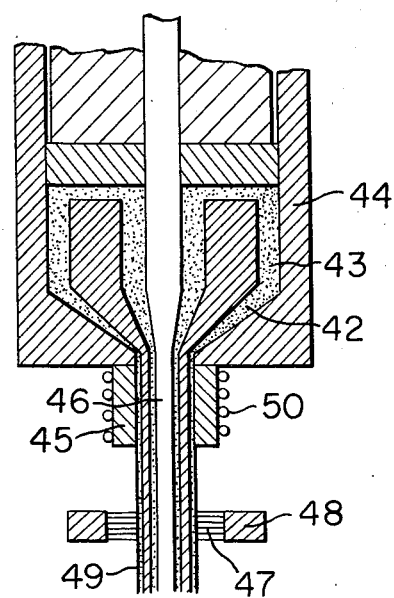
FIG. 11 is a schematic illustration of one embodiment of the present invention practiced as described by working example No. 1 herein.

The preform 40 was placed in a cylinder 44 of an extruder for paste extrusion, as illustrated in FIG. 11. A die 45 mounted on the extruder had an inner diamter of 13 mm and into the center of the extruder and die was inserted a mandrel having a shank portion 46 of a diameter of 6.5 mm. At a distance about 100 mm below the outlet of the die 45 and surrounding the extruded mass 49, was disposed a brush 47 held by a brush holder 48. The brush was made of raccoon dog hair and was about 30 mm in thickness in the direction of extrusion. The preform 40 was extruded at a pressure of 90 kg/cm² (in the cylinder portion 44) and at a speed of 200 m/min to produce an extrudate 49 having an inner core 42. The die 45 was maintained at about 80° C. by a heater 50. The extrudate 49 was passed through a normal temperature zone for a distance of about 1.2 m while being contacted by the tip of the brush 47 and then through the furnace 9 of FIG. 2. The furnace used was a vertical furnace with an overall length of 5 m. The upper half of the furnace (length 2.5m) was a drying zone 10 wherein the temperature was so controlled as to increase downwardly within a range of 110°–220° C. while the lower half (length of 2.5 m) served as a sintering zone 11 heated to temperatures ranging from 340°–390° C.

The sintered product discharged from the lower portion of the furnace 9 had a surface of reduced gloss but no cracks nor blisters at all were found. When observed by a microscope, sections of the molding showed no cracks or fine voids but, rather, a dense uniform structure.

The extruded form 49 was slightly transparent (due to the presence of the lubricant) when observed immediately after being discharged from the die 45. However, once contacted with the brush 47, the surface quickly turned opaque (inherent to the PTFE) and was more frosted than the conventional forms not contacted with the brush.

When the extruded form 49 was not contacted with the brush 47, the resulting sintered form was found to have a number of cracks and blisters on its surface, and also had cracks and fine voids in its interior.

EXAMPLE 2

Example 1 was repeated using the same extruder and the same extruding conditions to produce a molding of the same construction. In this example, however, a discharge electrode 33 of the type shown in FIG. 9 was used instead of the brush of Example 1. The metal electrode 33 was formed with a plurality of radially and inwardly extending steel needle electrodes 32 each having a length of about 10 mm and a diameter of 0.3 mm. The discharge electrodes 32 were rigidly attached to the brass electrode 33, the latter having an inner diameter of 50 mm, an outer diameter of 100 mm and a thickness of 20 mm. The discharge electrodes 32 projected from the inner wall of the central bore of the metal electrode toward its central axis, but terminating short of that axis to leave a space at the center through which the extruded from was passed. A high voltage from a transformer was passed to the metal electrode 33 through one lead wire with the other being grounded. When a voltage of about 2500 V or more was applied to the discharge electrode 32, no cracks nor blisters were found to form on the surface of the molding. In addition, the molding obtained was not reduced in surface gloss as experienced in Example 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process for producing a molded article by extrusion of a paste of a powder of polytetrafluoroethylene admixed with a volatile extrusion lubricant, wherein the paste is extruded through a die to form a molding having a relatively dense suface layer and the molding is subsequently sintered by passing it through a heating zone for drying and sintering, the improvement comprising breaking said surface layer of the extruded molding prior to entry into the heating zone, thereby facilitating volatilization of the lubricant from the molding.

2. The process of claim 1 wherein the outer surface layer of the molding is broken by mechanical abrasion.

3. The process of claim 1 wherein the outer surface layer of the molding is broken by electrical discharges.

4. The process of claim 2 wherein the mechanical abrasion is by means of a fiber brush having bristles harder than said molding, said fiber brush arranged around and contacting substantially the entire periphery of the molding.

5. The process of claim 3 wherein the electrical discharges are produced by a plurality of needle electrodes surrounding the circumference of the molding.

* * * * *